United States Patent [19]
Thompson

[11] Patent Number: 6,059,295
[45] Date of Patent: May 9, 2000

[54] FLEXIBLE SEAL FOR A LASER SYSTEM

[75] Inventor: Paul S. Thompson, Santee, Calif.

[73] Assignee: Cymer, Inc., San Diego, Calif.

[21] Appl. No.: 09/108,899

[22] Filed: Jul. 1, 1998

[51] Int. Cl.[7] .................................................. F16J 15/02
[52] U.S. Cl. ..................... 277/630; 277/634; 277/641; 277/647
[58] Field of Search ................................... 277/598, 602, 277/615, 616, 630, 634, 641, 647

[56] References Cited

U.S. PATENT DOCUMENTS

| | | | |
|---|---|---|---|
| 2,832,223 | 4/1958 | Couraud | 277/634 X |
| 5,076,594 | 12/1991 | Baugh | 277/616 X |
| 5,667,224 | 9/1997 | Streckert et al. | 277/634 |

*Primary Examiner*—Anthony Knight
*Assistant Examiner*—Karlena D. Schwing
*Attorney, Agent, or Firm*—William B. Tiffany

[57] ABSTRACT

A flexible seal permits slidable access to equipment components in an essentially zero clearance environment, without time-consuming disassembly and reassembly. A flexible seal ring includes a thickened radiused boss connected to the outer rim of a flexible flange, connected to a mounting block by an inner hub. The seal ring can be formed as a unitary structure from metal, plastic, elastomer, wood, foam, composite, or combinations thereof. Usually the seal ring has rotational symmetry. Alternatively, the seal ring has an elongated or irregular configuration, e.g. for sealing around a slot. The seal ring can contain an outer o-ring groove. The seal ring is attached to a first plate. A second plate slides laterally to align with the first plate, contacting the flexible seal surface. This presses the seal surface against the second plate, sealing the interface.

20 Claims, 6 Drawing Sheets

FLEXIBLE SEAL FOR A LASER SYSTEM

FIELD OF THE INVENTION

The present invention relates to a flexible seal and to a method for installing and using same, and particularly relates to a metallic flexible gas seal used in conjunction with lasers and optical systems.

BACKGROUND

Particularly in industrial applications, it is important to minimize the floor space occupied by manufacturing equipment. Thus it is important that such equipment be as compact as possible. Additionally, such manufacturing equipment typically requires periodic maintenance or component replacement. For required maintenance and/or component replacements, it is important to minimize the equipment down-time. Therefore it is desirable to facilitate access to internal components in a compact and often congested configuration with minimal disassembly and reassembly. In accordance with the conventional art, this usually necessitates a design compromise between compactness and access. For example, in a compact apparatus there is often essentially zero clearance for needed access to a component.

Figure 1A:
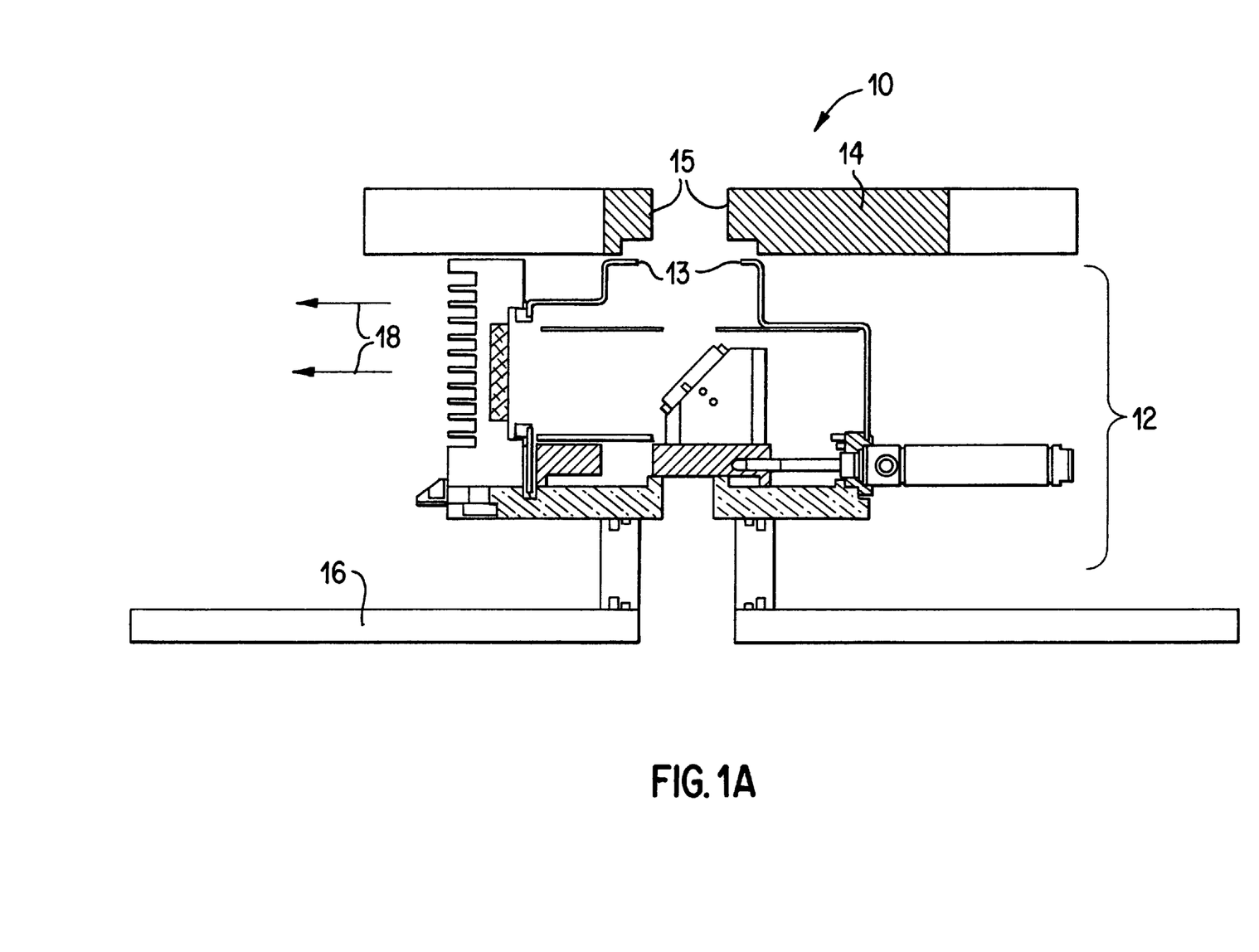
FIG. 1A is a partial cross-sectional view of equipment having a housing mounted between two plates with essentially zero clearance.

FIG. 1A is a partial cross-sectional view of an optical shutter assembly for use with a laser and will be designated as equipment 10. Equipment 10 has a housing 12 mounted between two plates 14 and 16 with essentially zero clearance. Equipment 10, not including a seal, will later be contrasted with similar equipment in FIG. 1B including a seal. With equipment 10 fully assembled, openings 13 and 15 in housing 12 and plate 14, respectively, are accurately aligned. To remove housing 12, it may be necessary first to remove plate 16 from housing 12, and then to remove housing 12 from plate 14. Optionally, it is possible to detach housing 12 from both plates 14 and 16 and then remove housing 12 slidably parallel to plates 14 and 16, as indicated by arrows 18.

Mechanical seals, including fluid seals, gas seals, pressure seals, and vacuum seals, are widely used in a variety of applications. Materials commonly used as sealing surfaces include metals, plastics, foams, and elastomers. Seal configurations include, for example flexible o-rings or gaskets, which are typically deformed under compression to provide a seal between two or more solid surfaces. Many seals are used to prevent a fluid or fluids, for example air and/or other gas, from leaking into or out of an enclosure. In lasers and optical systems, particularly gas lasers, seals are typically required. Conventional seal configurations include o-ring face seals, o-ring gland seals, and gasket seals, formed for example of metal, elastomer, and/or foam materials.

Figure 1B:
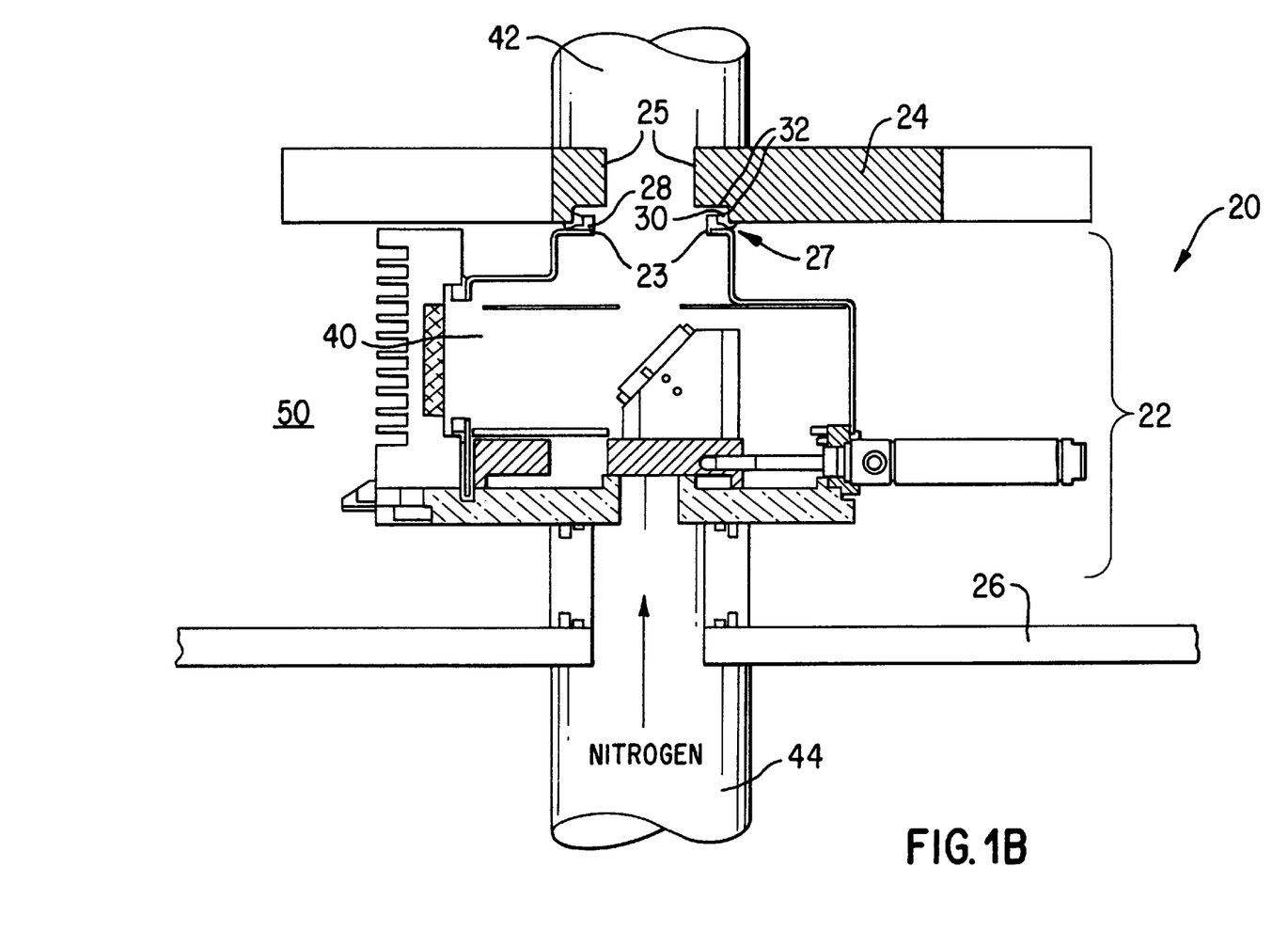
FIG. 1B is a partial cross-sectional view of equipment similar to equipment of FIG. 1A, including a sealed interface.

FIG. 1B is a partial cross-sectional view of equipment 20 similar to equipment 10 of FIG. 1A, but including a sealed interface. Equipment 20 includes a housing 22 mounted between plates 24 and 26 with essentially zero clearance. With equipment 20 fully assembled, openings 23 and 25 in housing 22 and plate 24, respectively, are accurately aligned. Additionally, equipment 20 includes a seal assembly 27 at the interface between housing 22 and plate 24, which prevents leakage of fluid around the edges of openings 23 and 25. A sealed chamber 40 isolated from exterior 50, is thereby formed internal to housing 22. Typically sealed chamber 40 extends through openings 23 and 25 in an upper extension 42, indicated by dashed lines in FIG. 1B. Likewise sealed chamber 40 optionally extends through corresponding openings in plate 25 in a lower extension 44, also indicated by dashed lines in FIG. 1B. Conventionally, seal assembly 27 is attached to housing 22 and includes a bezel ring 28 that protrudes into opening 25 in plate 24. Optionally, seal assembly 27 is attached to plate 24, and bezel ring 28 protrudes into opening 23 in housing 22. Protruding bezel ring 28 prevents the removal of housing 22 slidably relative to plates 24 and 26 of equipment 20. Therefore, in accordance with the conventional art, housing 22, including a seal assembly 27, can be removed from equipment 20 only by first removing plate 26 or 24.

Housing 22 is an optical shutter housing mounted with essentially zero clearance between two parallel plates 24 and 26 of an ultraviolet (UV) excimer laser system (see for example U.S. application Ser. No. 08/900,203, filed Jul. 24, 1997, which is incorporated herein by reference in its entirety). Accurately aligned openings 23 and 25, which accommodate the laser beam path, are provided in shutter housing 22 and in at least one plate 24, respectively. Seal assembly 27 prevents UV radiation from escaping and confines pure nitrogen gas used to purge oxygen from the beam path. Oxygen could otherwise corrode optically coated surfaces or form ozone under UV irradiation. Seal assembly 27 typically comprises a silicone foam rubber gasket 30 compressed between a counterbore 32 in plate 24 and protruding bezel ring 28 attached to shutter housing 22. This configuration further prevents direct emanation of reflected or scattered UV radiation. However, protruding bezel ring 28 necessitates removal of a plate 24 or 26 before shutter housing 22 can be removed. This is a time consuming process, which is particularly undesirable in an industrial environment.

Needed in the art is a seal configuration and method of sealing that accommodate tolerance variations and provide a combination of seal integrity, optimum equipment compactness, and efficient accessibility for maintenance and component replacement, particularly relating to industrial apparatus, and more particularly relating to laser and optical equipment.

SUMMARY

In some embodiments of the present invention, a flexible seal is provided at the interface between two parallel plates. The flexible seal permits slidable access to equipment components in an essentially zero clearance environment without time-consuming disassembly and reassembly. A flexible seal ring includes a thickened radiused boss connected to the outer rim of a flexible flange. The flexible flange, in turn, is spaced from a mounting block by an inner hub, such that a substantially radial groove is formed between the mounting block, inner hub, and flexible flange. In some embodiments, the thickened boss, flexible flange, inner hub, and mounting block are machined, cast, and/or molded as a monolithic structure. In some embodiments, the seal material is metal, providing durability and resistance to UV radiation. In some embodiments, the seal ring material is plastic, elastomer, wood, foam, metal, composite, or a combination thereof. In some embodiments, surfaces are metallized.

Various shapes and sizes of seal rings meet particular requirements. In some embodiments the flexible seal ring has a rotational symmetry about an inner bore. In other embodiments, the flexible seal ring has an elongated or irregular configuration, e.g. for sealing around a slot. In some embodiments, the flexible seal ring includes an outer diameter containing an o-ring groove.

The seal ring is attached to a first plate, and a second plate is aligned with the first plate by sliding parallel with the plate surface, contacting the flexible seal surface, and thereby deflecting the flexible flange. Restoring forces press the seal surface against the second plate, thus sealing the interface. In some embodiments, the seal ring is attached to the first plate by installing an o-ring around the mounting block and inserting the mounting block into a recess, e.g. a counterbore, in the first plate. In some embodiments, the second plate is slidably aligned with the assistance of linear grooves guided by dowel pins. Precisely located pockets at the ends of the grooves provide a positive stop and accurate positioning of the second plate relative to the first plate. In some embodiments, the flexible seal ring includes a counterbore to facilitate extraction of the seal ring from the first plate.

Thus, in some embodiments of the invention, a flexible seal between parallel plates is provided that satisfies the need to combine seal integrity and optimum compactness with efficient access, particularly in a zero clearance environment.

BRIEF DESCRIPTION OF THE DRAWINGS

The present invention may be better understood, and its numerous objects, features, and advantages made apparent to those skilled in the art by referencing the accompanying drawings. For ease of understanding and simplicity, common numbering of elements within the illustrations is employed where an element is the same in different drawings.

FIG. 2 is a view of detail 2C of the flexible seal ring of FIG. 2B;

DETAILED DESCRIPTION OF THE EMBODIMENTS

The following is a detailed description of illustrative embodiments of the present invention. As these embodiments of the present invention are described with reference to the aforementioned drawings, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings are not to be considered in a limiting sense as it is understood that the present invention is in no way limited to the embodiments illustrated.

In some embodiments of the present invention, a flexible seal is provided that permits slidable access to equipment components in an essentially zero clearance environment without time-consuming disassembly and reassembly. In some embodiments, the seal material is metal, providing durability and resistance to UV radiation. In some embodiments, the seal material is any one or combination of plastic, elastomer, wood, foam, metal, and composite. Various shapes and sizes are provided for particular applications.

Figure 2A:
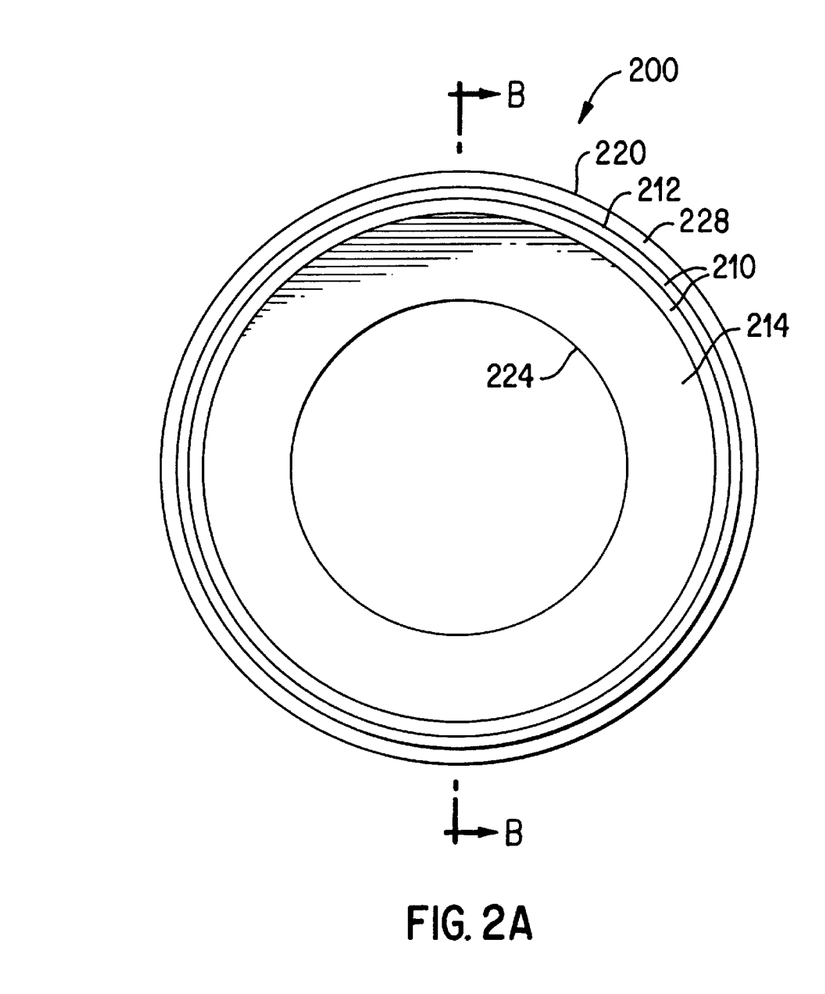
FIG. 2A is a plan view of a flexible seal ring, in accordance with an embodiment of the invention.
Figure 2B:
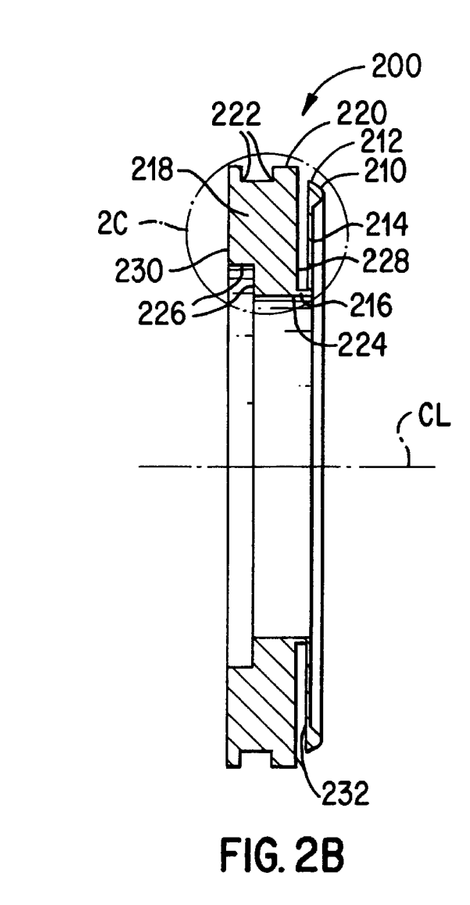
FIG. 2B a cross-sectional view of the flexible seal ring of FIG. 2A, along section B—B of FIG. 2A.
Figure 2C:
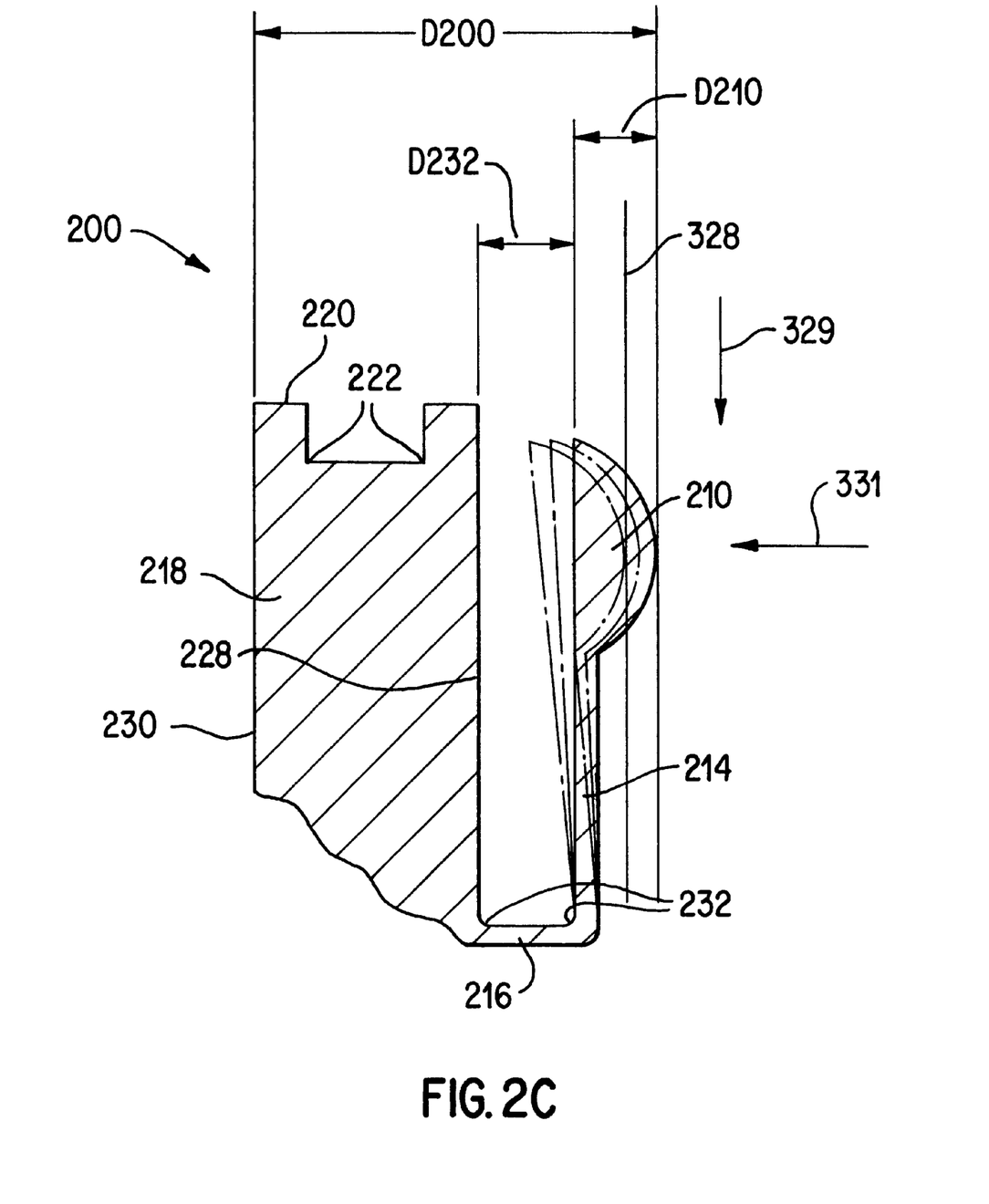
Figure 3A:
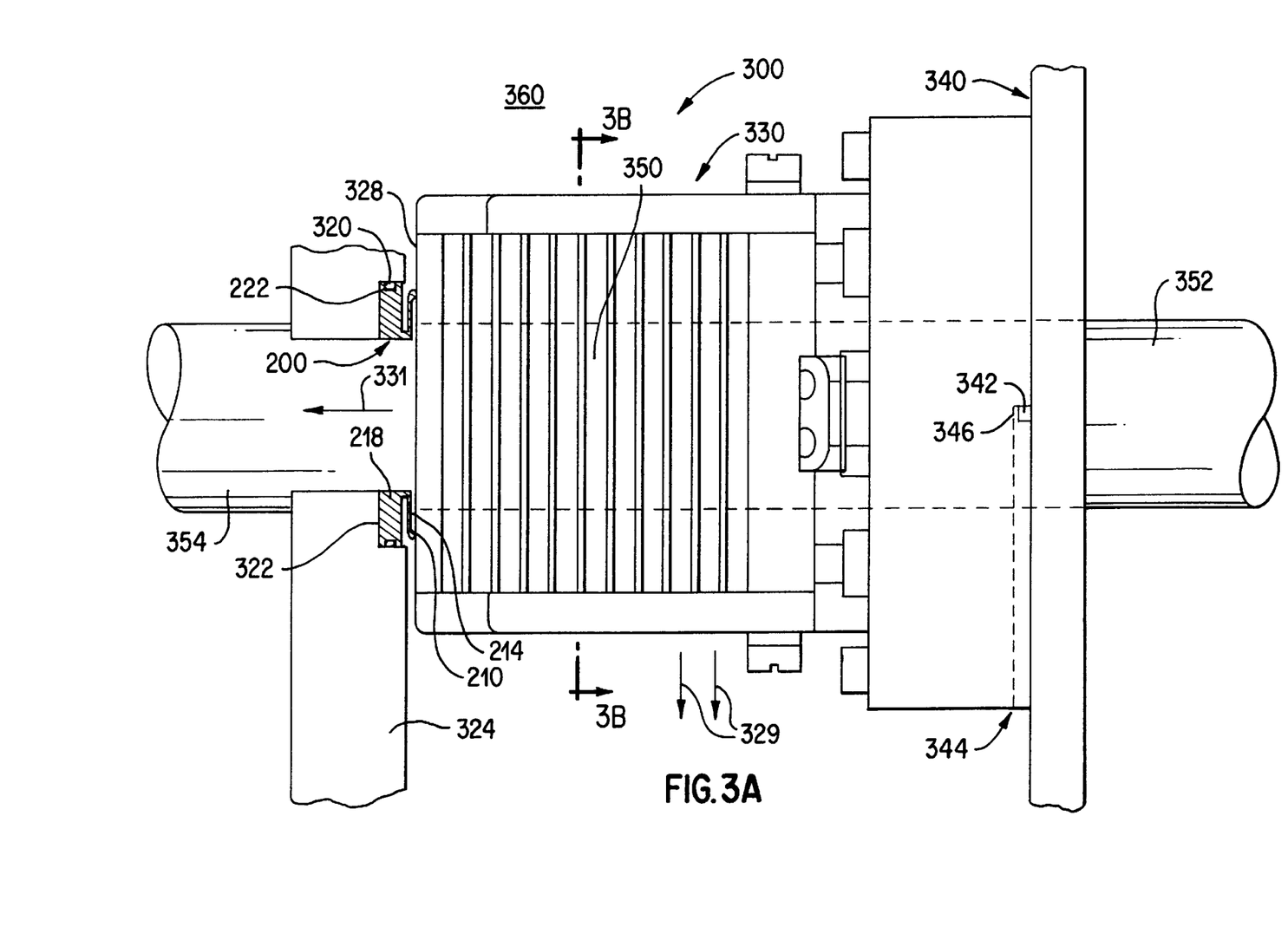
FIG. 3A is a cross-sectional view of an interface seal incorporating a flexible seal ring, in accordance with an embodiment of the invention.

FIG. 2A is a plan view of a flexible seal ring 200, in accordance with an embodiment of the invention. FIG. 2B is a cross-sectional view of flexible seal ring 200, along section B—B of FIG. 2A. FIG. 2C is a view of the detail 2C of flexible seal ring 200, as shown in FIG. 2B. FIG. 3A shows seal ring 200 in use. Referring to FIGS. 2A and 2B, a seal surface 210 comprises an annular raised boss protruding axially from a flexible annular flange 214 at or near the outer rim 212 of flexible flange 214. An inner hub 216 connects at one end to the inner diameter of flexible flange 214 on a side opposite seal surface 210. Inner hub 216 connects at the other end to an outer face 228 of a mounting block 218, thereby defining a groove 232 together with outer face 228 and flexible flange 214. Mounting block 218 has an outer diameter 220 containing an o-ring groove 222 and includes an inner bore 224. In some embodiments, flexible seal ring 200 has rotational symmetry about a center line CL. In some embodiments, inner bore 224 is concentric with a counterbore 226 in an inner face 230 of mounting block 218 opposite outer face 228.

FIG. 3A is a cross-sectional view of flexible seal ring 200 assembled into equipment 300. To use flexible seal ring 200, an o-ring 320 is installed in o-ring groove 222. O-ring 320 has dimensions selected in accordance with the conventional art. Mounting block 218 is then inserted into an appropriately dimensioned counterbore 322 in one plate 324 forming the sealed interface, such that seal surface 210 faces away from counterbore 322. O-ring 320 provides a seal between plate 324 and flexible seal ring 200. Next, a second plate (face plate 328 of a housing 330) forming the sealed interface is aligned relative to plate 324 by sliding housing 330 parallel to plate 324, as shown by arrows 329 in FIGS. 2C and 3A.

Face plate 328, when moved in the direction illustrated by arrows 329 in FIGS. 2C and 3A, contacts and exerts an axial force component against seal surface 210 in the direction illustrated by arrows 331 in FIGS. 2C and 3A. The axial force component on seal surface 210 is transferred into a bending moment on flexible flange 214, thereby flexing annular flange 214 as shown by the superimposed images in FIG. 2C. Elastic restoring forces in response to this flexure press seal surface 210 firmly against face plate 328, providing a seal between flexible seal ring 200 and housing 330. Seal surface 210 is radiused (see FIG. 2C) to insure integrity of the seal between seal surface 210 and face plate 328 over a range of contact angles, as flexible flange 214 is deflected.

The width D232 of groove 232 is wide enough to permit sufficient deflection of flexible flange 214 but narrow enough to prevent permanent deformation. Further, groove width D232 is narrow enough relative to the width D210 of seal surface 210 to insure that face plate 328 contacts seal surface 210 exclusively, when flexible flange 214 is maximally deflected. Seal surface width D210 is also wide enough to insure contact of face plate 328 exclusively with seal surface 210 over the deflection range encountered, yet narrow enough to allow seal surface 210 to conform flexibly to surface variations in face plate 328. The radial depth of groove 232 is sufficient to provide flexibility without permanent deformation or excessive load.

The thickness D200 of flexible seal ring 200 relative to the depth of counterbore 322 and the clearance between face plate 328 and plate 324 is selected such that face plate 328 maintains an axial load against seal surface 210 without overflexing flexible flange 214. Dimensions of o-ring groove 222 and diameters of mounting block 218 and counterbore 322 are conventionally selected such that o-ring 320 is properly deformed without extruding, in accordance with manufacturer recommendations.

In one embodiment, flexible seal ring 200 has a diameter of 55.63 mm and a thickness D200 of 8.65 mm, groove 232 has a width D232 of 1.02 mm, inner hub has an inner diameter of 31.75 mm and a thickness of 0.38 mm, flexible flange 214 has a thickness of 0.38 mm and overall diameter of 52.83 mm, and seal surface width D210 is 1.43 mm. Scaling or other modification of these and other dimensions to obtain comparable results would be within the skills of those having ordinary skill in the art.

In one embodiment, flexible seal ring 200 is fabricated from 6016-T6 aluminum alloy. In some embodiments, a flexible seal ring in accordance with the invention is formed of any of a variety of materials, including plastic, metal, elastomer, wood, composite, and other material having sufficient flexibility to avoid breakage. Fabrication methods typically include any of a variety of conventional techniques such as machining, casting, molding, stamping and combinations thereof.

In the above described embodiments, a flexible seal ring is formed of a monolithic single structure. In some embodiments, a flexible seal ring is assembled from two or more structural elements. For example, in some embodiments flexible flange 214 and seal surface 210 are made of an elastomeric material, which in some embodiments is metallized. In some embodiments, seal surface 210 is separately configured as an o-ring or gasket, which is captured, for example, within a dovetail groove formed in flexible flange 214.

In the above embodiments, a flexible seal configuration having an axis of rotational symmetry is described. Alternatively, in some embodiments a flexible seal configuration has an oval shape, for example, to seal around a slot shaped enclosure. In some embodiments, a flexible seal has an irregular shaped configuration.

Figure 3B:
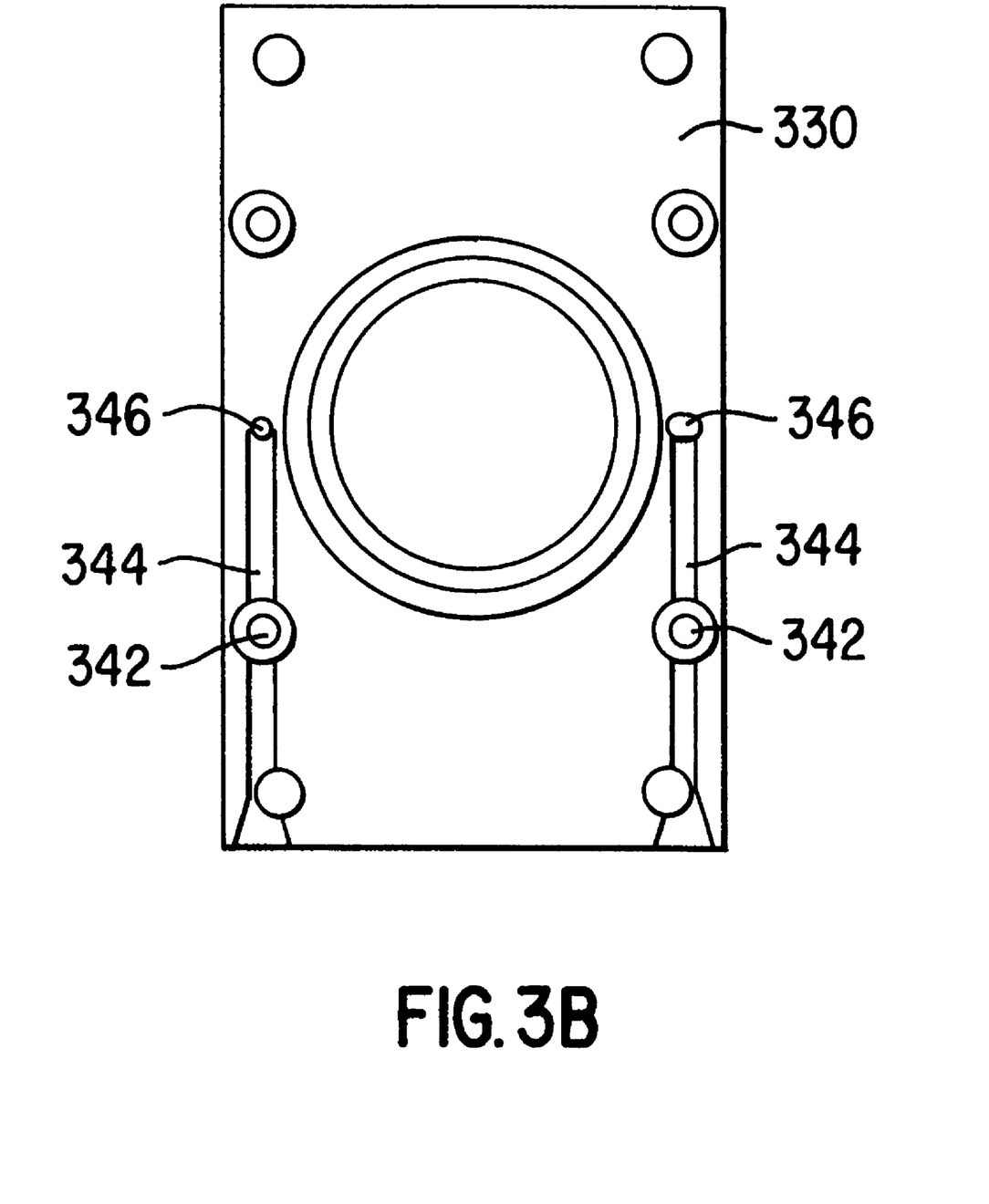
FIG. 3B is a view of the interface seal along section 3B—3B of FIG. 3A.

In some embodiments, installation of housing 330 is facilitated by protrusions (e.g., dowel pins 342) mounted to an opposing plate 340 (see FIGS. 3A–3B) that is rigidly positioned relative to plate 324. Dowel pins 342 are thus rigidly positioned relative to plate 324. Housing 330 contains linear grooves 344 rigidly positioned relative to housing 330 and face plate 328. Linear grooves 344 have widths and spacings corresponding to the diameters and spacings respectively of dowel pins 342. As housing 330 slides into position relative to plate 324, as shown by arrows 329, linear grooves 344 clear dowel pins 342. The ends of linear grooves 344 terminate in precisely located pockets 346 such that, when housing 330 reaches alignment with plate 324, pockets 346 contact and capture dowel pins 342, thus stopping and accurately positioning housing 330 relative to plate 324.

In some embodiments, flexible seal ring 200 includes a counterbore 226 (see FIG. 2B). Counterbore 226 provides a convenient recess for extracting flexible seal ring 200 from counterbore 322 (see FIG. 3A) either manually or with the use of conventional tools.

Referring to FIG. 3A, housing 330, in one embodiment, is an optical shutter housing similar to housing 22 illustrated in FIG. 1B. Optical shutter housing 330 is mounted with essentially zero clearance between two parallel plates 324 and 340 of an ultraviolet (UV) excimer laser system (see for example U.S. application Ser. No. 08/900,203, cited above). Accurately aligned openings, which accommodate the laser beam path, are provided in shutter housing 330 and in at least one plate 324. Flexible seal ring 200 at the interface between plate 324 and shutter housing 330 prevents UV radiation from escaping and confines pure nitrogen gas used to purge oxygen from the beam path.

In accordance with the described embodiment, flexible seal ring 200 facilitates the isolation of a sealed chamber 350 (indicated by dashed lines in shutter housing 330) from an exterior environment 360. Typically, sealed chamber 350 extends through openings in plates 324 and 340 as shown by dashed line extensions 352 and 354, respectively, in FIG. 3A.

Thus, described in the embodiments are flexible seal configurations and methods that satisfy the need to combine seal integrity and optimum equipment compactness with efficient accessibility for maintenance and component replacement, while accommodating tolerance variations. Of importance, installation and removal of equipment elements as described in the embodiments can be performed in a zero clearance environment, without time-consuming disassembly and reassembly. While embodiments of the present invention have been shown and described, it will be obvious to those skilled in the art that changes and modifications to these illustrative embodiments can be made without departing from the present invention in its broader aspects. Thus it should be evident that there are other embodiments of this invention which, while not expressly described above, are within the scope and spirit of the present invention. Therefore, it will be understood that the appended claims necessarily encompass all such changes and modifications as fall within the described invention's true scope and spirit; and further that this scope and spirit is not limited merely to the illustrative embodiments presented to demonstrate that scope and spirit.

What is claimed is:

1. An apparatus including a flexible seal ring, said flexible seal ring comprising:

a radiused seal surface;

a flexible flange having a substantially planar first surface and a substantially planar second surface opposite and substantially parallel to said first surface, said radiused seal surface attached to and extending transversely from said first surface;

an inner hub attached to and extending transversely from said second surface of said flexible flange;

a mounting block defining an outer perimeter having an o-ring groove, said groove containing an o-ring;

said mounting block being interconnected by said inner hub to said flexible flange such that said mounting block, said inner hub, and said flexible flange mutually define a groove;

said seal surface, said flexible flange, said inner hub, and said mounting block respectively comprising closed bands surrounding an inner void; and said flexible flange being deflectable toward said groove in response to force exerted on said seal surface transversely to said flexible flange.

2. An apparatus according to claim 1, wherein said seal surface, said flexible flange, said inner hub, and said mounting block form a single monolithic structure.

3. An apparatus according to claim 1, wherein the material of said flexible flange and said seal surface is a metal.

4. An apparatus according to claim 1, wherein the material of said flexible flange is selected from the group consisting of aluminum, copper, elastomer, metallized elastomer, and polymeric foam.

5. An apparatus according to claim 1, wherein the material of said seal surface is selected from the group consisting of aluminum, copper, elastomer, metallized elastomer, and polymeric foam.

6. An apparatus according to claim 1, wherein said inner void includes a recess.

7. An apparatus according to claim 1, wherein said seal surface, said flexible flange, said inner hub, and said mounting block respectively have rotational symmetry about a central cylindrical bore proximate to said inner hub.

8. An apparatus according to claim 1, further comprising:
   a first sealing plate attached to said flexible seal ring such that said flexible flange is oriented substantially parallel with said first sealing plate and such that said seal surface faces away from said first sealing plate; and
   a second substantially planar sealing plate aligned parallel and proximate to said first sealing plate, said second substantially planar sealing plate contacting said seal surface of said flexible seal ring such that said flexible flange is deflected toward said groove and such that said seal surface is pressed against said second sealing plate.

9. An apparatus according to claim 8, wherein said mounting block is recessed into a counterbore in said first sealing plate.

10. A method of sealing an interface between proximate parallel plates, comprising:
    attaching a flexible seal ring to a substantially planar first sealing plate, said flexible seal ring including a substantially radiused seal surface, a flexible flange having a substantially planar first surface and a substantially planar second surface opposite and substantially parallel to said first surface, said substantially radiused seal surface attached to and extending transversely from said substantially planar first surface, an inner hub attached to and extending transversely from said substantially planar second surface of said flexible flange, and a mounting block interconnected by said inner hub to said flexible flange such that said mounting block, said inner hub, and said flexible flange mutually define a groove;
    attaching said flexible seal ring to said substantially planar first sealing plate such that said flexible flange is oriented substantially parallel with said substantially planar first sealing plate and such that said seal surface faces away from said first sealing plate;
    providing an o-ring groove in an outer perimeter of said mounting block; installing an o-ring into said o-ring groove;
    aligning a substantially planar second sealing plate substantially parallel with said substantially planar first sealing plate by sliding said substantially planar second sealing plate in a direction substantially mutually parallel with said substantially planar first and said second sealing plates;
    contacting said substantially planar second sealing plate against said seal surface, thereby exerting a force on said seal surface, said force being directed substantially transversely relative to said substantially planar second sealing plate; and
    deflecting said flexible flange in response to said transversely directed force, thereby generating elastic restoring forces that press said seal surface against said substantially planar second sealing plate.

11. A method according to claim 10, wherein said seal surface, said flexible flange, said inner hub, and said mounting block form a single monolithic structure.

12. A method according to claim 10, wherein the material of said flexible flange and said seal surface is a metal.

13. A method according to claim 10, wherein the material of said flexible flange is selected from the group consisting of aluminum, copper, elastomer, metallized elastomer, and polymeric foam.

14. A method according to claim 10, wherein the material of said seal surface is selected from the group consisting of aluminum, copper, elastomer, metallized elastomer, and polymeric foam.

15. A method according to claim 10, wherein said seal surface, said flexible flange, said inner hub, and said mounting block respectively have rotational symmetry about a central cylindrical bore proximate to said inner hub.

16. A method according to claim 10, wherein said attaching further comprises:
    forming a counterbore in said first sealing plate, said counterbore having a counterbore perimeter; and
    inserting said mounting block into said counterbore, such that said o-ring is compressed radially between said o-ring groove and said counterbore perimeter.

17. A method according to claim 10, wherein said aligning further comprises guiding said second sealing plate using linear grooves having a fixed position relative to said second sealing plate, said linear grooves traveling over pins having a fixed position relative to said first sealing plate.

18. An apparatus including a flexible seal ring, said flexible seal ring comprising:
    a radiused seal surface;
    a flexible flange having a first surface and a second surface opposite said first surface, said radiused seal surface attached to and extending transversely from said first surface;
    an inner hub attached to and extending transversely from said second surface of said flexible flange;
    a mounting block interconnected by said inner hub to said flexible flange such that said mounting block, said inner hub, and said flexible flange mutually define a groove, wherein said mounting block includes an outer perimeter having an o-ring groove, said o-ring groove containing an o-ring;
    said seal surface, said flexible flange, said inner hub, and said mounting block respectively comprising closed bands surrounding an inner void; and
    said flexible flange being deflectable toward said groove in response to force exerted on said seal surface transversely to said flexible flange.

19. A method of sealing an interface between proximate parallel plates, comprising:
    attaching a flexible seal ring to a first substantially planar sealing plate, said flexible seal ring including a radiused seal surface, a flexible flange having a first surface and a second surface opposite said first surface, said radiused seal surface attached to and extending transversely from said first surface an inner hub attached to and extending transversely from said second surface of said flexible flange, and a mounting block interconnected by said inner hub to said flexible flange such that said mounting block, said inner hub, and said flexible flange mutually define a groove;
    attaching said flexible seal ring to said first sealing plate such that said flexible flange is oriented substantially parallel with said first sealing plate and such th at said seal surface faces away from said first sealing plate;

aligning a second substantially planar sealing plate parallel with said first sealing plate by sliding said second sealing plate in a direction mutually parallel with said first and said second sealing plates;

contacting said second sealing plate against said seal surface, thereby exerting a force on said seal surface, said force being, directed substantially transversely relative to said second sealing plate; and deflecting said flexible flange in response to said transversely directed force, thereby generating elastic restoring forces that press said seal surface against said second sealing, plate, wherein said attaching further comprises:
  providing an o-ring groove in an outer perimeter of said mounting block;
  installing an o-ring into said o-ring groove;
  forming a counterbore in said first sealing plate, said counterbore having a counterbore perimeter; and
  inserting said mounting block into said counterbore, such that said o-ring is compressed radially between said o-ring groove and said counterbore perimeter.

20. A method of sealing an interface between proximate parallel plates, comprising:

attaching a flexible seal ring to a first substantially planar sealing plate, said flexible seal ring including a radiused seal surface, a flexible flange having a first surface and a second surface opposite said first surface, said radiused seal surface attached to and extending transversely from said first surface, an inner hub attached to and extending transversely from said second surface of said flexible flange, and a mounting block interconnected by said inner hub to said flexible flange such that said mounting block, said inner hub, and said flexible flange mutually define a groove;

attaching said flexible seal ring to said first sealing plate such that said flexible flange is oriented substantially parallel with said first sealing plate and such that said seal surface faces away from said first sealing plate;

providing an o-ring groove in an outer perimeter of said mounting block; installing an o-ring into said o-ring groove;

aligning a second substantially planar sealing plate parallel with said first sealing plate by sliding said second sealing plate in a direction mutually parallel with said first and said second sealing plates;

contacting said second sealing plate against said seal surface, thereby exerting a force on said seal surface, said force being directed substantially transversely relative to said second sealing plate; and deflecting said flexible flange in response to said transversely directed force, thereby generating elastic restoring forces that press said seal surface against said second sealing plate, wherein said aligning further comprises guiding said second sealing plate using linear grooves having a fixed position relative to said second sealing plate, said linear grooves traveling over pins having a fixed position relative to said first sealing plate.

* * * * *